United States Patent
Gopalan et al.

(10) Patent No.: US 6,195,197 B1
(45) Date of Patent: Feb. 27, 2001

(54) LITHIUM NIOBATE SINGLE-CRYSTAL AND PHOTO-FUNCTIONAL DEVICE

(75) Inventors: Venkatraman Gopalan, State College, PA (US); Terrence E. Mitchell, Los Alamos, NM (US); Kenji Kitamura; Yasunori Furukawa, both of Tsukuba (JP)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/143,568

(22) Filed: Aug. 28, 1998

(51) Int. Cl.[7] .................................................. G02F 1/35
(52) U.S. Cl. .................................................. 359/326
(58) Field of Search ..................... 385/122; 359/326–332

(56) References Cited

U.S. PATENT DOCUMENTS 5,249,250 * 9/1993 Yamada et al. .................. 385/122
5,943,465 * 8/1999 Kawaguchi et al. ............. 385/122
5,991,067 * 11/1999 Minakata et al. ................ 359/332

OTHER PUBLICATIONS

V. Gopalan et al., "The Role of Nonstoichiometry in 180° Domain Switching of $LiNbO_3$ Crystals," Applied Physics Letters, vol. 72, No. 16, pp. 1981–1983, Apr. 20, 1998.

Kenji Kintaka et al., "High–Efficiency $LiNbO_3$ Waveguide Second–Harmonic Generation Devices With Ferroelectric––Domain–Inverted Gratings Fabricated by Applying Voltage," Journal of Lightwave Technology, vol. 14, No. 3, Mar. 1996, pp. 462–468.

* cited by examiner

Primary Examiner—John D. Lee
(74) Attorney, Agent, or Firm—Bruce H. Cottrell

(57) ABSTRACT

Provided are lithium niobate single-crystal that requires a low voltage of not larger than 10 kV/nm for its ferroelectric polarization inversion and of which the polarization can be periodically inverted with accuracy even at such a low voltage, and a photo-functional device comprising the crystal. The crystal has a molar fraction of $Li_2O/(Nb_2O_5+Li_2O)$ of falling between 0.49 and 0.52. The photo-functional device can convert a laser ray being incident thereon.

6 Claims, 4 Drawing Sheets

LITHIUM NIOBATE SINGLE-CRYSTAL AND PHOTO-FUNCTIONAL DEVICE

This invention was made with government support under Contract No. W-7405-ENG-36 awarded by the U.S. Department of Energy. The government has certain rights in the invention.

FIELD OF THE INVENTION

The present invention relates to lithium niobate ($LiNbO_3$) single-crystal of many applications in various technical fields of optical information processing, optical working, photochemical reaction, optical instrumentation control and others where laser rays are used. The invention also relates to a photo-functional device comprising lithium niobate single-crystal, in which the polarization of the crystal is periodically inverted to thereby shorten or prolong the fundamental wavelength of a laser ray being incident on the device.

BACKGROUND OF THE INVENTION

The phase diagram of lithium niobate single-crystal was known from long ago. For producing lithium niobate single-crystal with high compositional homogeneity, one conventional method known in the art comprises rotational pulling of crystal from a flux as combined with growing the crystal being pulled, in which the flux has a congruent melt composition of such that the crystal being grown and the flux are equilibrated to have the same composition, and has a molar fraction of $Li_2O/(Nb_2O_5+Li_2O)$ of being 0.485. Since the as-grown lithium niobate single-crystal thus produced in the method is in a multi-domain condition, it is subjected to poling treatment of applying a voltage thereto in the direction of the Z-axis of the crystal being heated at a temperature not lower than its Curie temperature of about 1150° C. to thereby unipolarize the crystal, followed by cooling it. Then, the resulting, single-domain crystal is worked to have a predetermined size and used in various fields.

As having a favorable electrooptical constant and a favorable non-linear optical constant, the lithium niobate single-crystal is widely noticed as a substrate material for light modulators, light switches, Q switches, wave changing devices, etc. Recently, in particular, expected is the development of waveguide-type, optical second-harmonic generation (SHG) devices capable of converting a semiconductor and solid state lasers having a near infrared wavelength into a blue light having a semi-wavelength by means of a non-linear optical effect. Above all, most studied are SHG devices comprising an element of lithium niobate single-crystal with its polarization structure being periodically inverted, as light sources for high-density recording and reproduction of optical discs. The SHG devices of that type are driven in a quasi-phase matching (QPM) system, in which the difference between the propagation constant of the fundamental wave and that of the higher harmonic wave is compensated for by the periodic structure to gain the phase matching. This system has many excellent characteristics in that its conversion efficiency is high, that parallel beaming and diffraction-limited collection of the light being outputted therefrom is easy, and that there is no limitation on the applicable material and wavelength. As the periodic structure for QPM, a structure of which the SHG coefficient (d coefficient) attribute is periodically inverted is most preferred for obtaining a high efficiency, and the positive or negative attribute of the d coefficient of ferroelectric crystal corresponds to the polarity of the ferroelectric polarization of the crystal. Therefore, the periodically-inverting structure of polarized ferroelectric domains is used in the QPM system. In the QPM-SHG system, usable are non-linear optical constants d22 and d33, which, however, could not be used in a phase matching system based on birefringence, and the QPM-SHG system of that type has the great advantage of high-efficiency wavelength conversion.

As compared with any other non-linear, optical single-crystal, lithium niobate single-crystal has a large non-linear optical constant (d33 of 34.4 pm/V), and this is one of materials which have heretofore been most studied for producing optical devices comprising them. The most important technique for realizing QPM-SHG devices comprising ferroelectric crystal is to produce periodic polarization-inversion domains with accuracy. The phase matching period around the fundamental wavelength, 0.8 $\mu$m of lithium niobate single-crystal is about 3 $\mu$m or so. However, the single-domain LN (lithium niobate) single-crystal as prepared by poling the as-grown one is extremely stable around room temperature, and it is not easy to invert the polarity of the crystal in an ordinary electric field. In this connection, reported were some techniques for polarization inversion of LN single-crystal at a temperature not higher than the Curie point of the crystal by various methods. The reported methods include, for example, 1) internal Ti diffusion, 2) $SiO_2$-charged thermal treatment, 3) proton-exchanging thermal treatment, 4) electron beam-scanning irradiation, and 5) voltage application. There are known many reports referring to the voltage application method 5). In one report, a periodic electrode is provided on one surface of a Z-cut LN single-crystal substrate, while a uniform electrode on the other surface thereof, and a pulse voltage is imparted to the crystal substrate via those electrodes to thereby obtain periodic polarization inversion of nearly the same pattern as that of the periodic electrode. By applying a near infrared laser to the QPM-SHG device thus produced in that manner, obtained is a blue SHG laser ray of a few mW or so. Except for SHG, QPM devices comprising LN single-crystal are further studied for application to wavelength conversion systems such as near infrared OPO, etc.

As has been mentioned hereinabove, the most important technique for realizing QPM-SHG devices comprising ferroelectric single-crystal is to produce periodic polarization-inversion domains with accuracy. Ideally, it is important to enlarge the overlapping of the inverted structure with the guided wave mode and to reduce the normalization matching error, or that is, to gain the polarization to inversion width ratio of 1/1. In fact, however, since the tolerance for the QPM condition is very narrow, the inversion period insufficiency, if any, in the devices produced ends in failure in realizing small-sized, high-efficiency devices. The method of electronic beam-scanning irradiation or voltage application to lithium niobate crystal for the polarization inversion of the crystal will be advantageous in that inverted lattices which are nearly uniform in the direction of the thickness of the crystal are formed. Even in this, however, it is still extremely difficult to gain the polarization to inversion width ratio of being completely 1/1. In addition, the process itself is problematic in its reproducibility. For example, in the voltage application method, a periodic electrode is provided on one surface of a Z-cut lithium niobate single-crystal substrate, while a uniform electrode on the other surface thereof, and a pulse voltage is imparted to the crystal substrate via those electrodes to thereby polarize and invert the area of the crystal substrate just below the periodic electrode, in the direction of the Z-axis of the crystal. In this, however, the inverted and polarized width of the crystal does not always correspond to the electrode width, and, in addition, the production error is great. Moreover, the method is further problematic in that the inversion will be often stopped in the middle of the formation of polarization and inversion on the Z-axis direction on the opposite surface of the crystal substrate, and that the polarized and inverted width will differ between the both surfaces of the Z-cut crystal substrate. For these reasons, therefore, it is difficult to produce ideal QPM-SHG devices according to this method.

The periodic width of polarization and inversion varies, depending on the phase-matching wavelength of the intended SHG device. For example, for long-wave phase matching, for example, in OPO devices, the inversion width to be controlled is large to be over ten $\mu$m or so. Therefore, the formation of long-wave devices is relatively easy as compared with that of short-wave ones in which the inversion width to be controlled is about 3 $\mu$m or so. However, the conventional methods could not still realize the production of ideal SHG devices. On the other hand, LN single-crystal requires a high voltage of not lower than 20 kV/mm for its polarization inversion. For a thin substrate of LN single-crystal having a thickness of 0.5 mm or so, it may be possible to produce polarized and inverted lattices throughout the entire substrate. However, thick substrates of LN single-crystal having a thickness of a few mm or so are problematic in that the production of complete polarization and inversion therein is difficult.

SUMMARY OF THE INVENTION

The present invention is to solve the problems noted above in the prior art, and to provide lithium niobate single-crystal which is characterized in that it has a molar fraction of $Li_2O/(Nb_2O_5+Li_2O)$ of falling between 0.49 and 0.52 and that it requires a voltage of not larger than 10 kV/mm for its ferroelectric polarization inversion.

The invention also provides a photo-functional device comprising lithium niobate single-crystal, in which the polarization structure of the crystal is periodically inverted to thereby shorten or prolong the wavelength of the laser ray being incident on the device and falling within a visible to near infrared range, and which is characterized in that the lithium niobate single-crystal has a molar fraction of $Li_2O/(Nb_2O_5+Li_2O)$ of falling between 0.49 and 0.52.

As a result of our assiduous studies, we, the present inventors have found that the problems in controlling the polarization and inversion of lithium niobate single-crystal result from the single-crystal material itself. On the basis of this finding, we have completed the present invention as in the above. Precisely, the conventional LN (lithium niobate) single-crystal substrates that have heretofore been used for polarization and inversion are of niobium-excessive lithium niobate single-crystal having a molar fraction of $Li_2O/(Nb_2O_5+Li_2O)$ of 0.485. This is because only such niobium-excessive one is commercially available because of the limitation on the single-crystal growing technique in the art. Naturally, the ideal composition of lithium niobate single-crystal has a ratio of Li/Nb of 1/1. The conventional LN single-crystal has many defects therein owing to the excessive niobium component. The inventors have clarified the facts that, because of the defects existing in the LN single-crystal, the hysteresis which indicates the relationship between the voltage necessary for polarization inversion of the crystal and the spontaneous polarization thereof is asymmetric, that the crystal requires a high voltage of over ten kV/mm for its polarization inversion, that the defects are unevenly distributed inside the crystal to cause easy pinning of polarization inversion in the site having many defects, and that, for those reasons, the technique of accurate polarization inversion of the conventional LN single-crystal by voltage application is limited.

FIG. 1 is referred to, which shows a non-stoichiometric defect model of lithium niobate single-crystal. In this, Li and Nb cations are positioned as ligands of oxygen-coordination octahedrons, and oxygen atoms exist at the apices of those octahedrons. LN single-crystal having a congruent melt composition contains an excessive Nb component therein. Therefore, in the LN single-crystal of that type, 1% of the excessive Nb ions occupy the Li ion site to give a vacancy to a degree of 4% in the Li site so as to keep the electric neutralization in the crystal. Having noted the large amount of the defects of reaching a few % in lithium niobate single-crystal, the present inventors have assiduously studied the significant influence of those defects on the characteristics of the crystal. In lithium niobate single-crystal which is in a paraelectric phase at a high temperature higher than the Curie point of the crystal, Li and Nb ions are positioned to be in a centro-symmetric condition; while in that in a ferroelectric phase at a temperature not higher than the Curie point of the crystal, Li and Nb ions are shifted in some degree in the z direction. Depending on the shifting direction of those ions, the polarization direction of the domains constituting the crystal is determined to be positive or negative. The technique of periodically inverting the polarization structure of crystal is to forcedly move the ions constituting the crystal at low temperatures by applying an electric field to the crystal. Where the crystal being treated by this technique has a congruent melt composition with many non-stoichiometric defects, Li ions are easily diffused and moved through the vacant sites in the crystal, but the excessive Nb ions having entered the Li sites are not easy to move. For these reasons, therefore, the crystal having such a congruent melt composition requires a large voltage for its polarization inversion. As opposed to this, it is believed that the polarization inversion of crystal having a nearly stoichiometric composition with reduced non-stoichiometric defects is easy.

Based on the matters mentioned above, the lithium niobate single-crystal of the first aspect of the present invention is characterized in that the crystal has a stoichiometric composition with a molar fraction of $Li_2O/(Nb_2O_5+Li_2O)$ of falling between 0.49 and 0.52, that the non-stoichiometric defect density in the crystal is reduced, that the voltage necessary for polarization inversion of the crystal is not larger than 10 kV/mm, or that is, smaller than that necessary for polarization inversion of the commercially-available lithium niobate single-crystal having a congruent melt composition with many defects, and that the polarization inversion of the crystal causes no pinning as the defect density in the crystal is very low.

The second aspect of the invention is to provide a photo-functional device comprising lithium niobate single-crystal, in which the polarization structure of the crystal is periodically inverted to thereby shorten or prolong the wavelength of the laser ray being incident on the device and falling within a visible to near infrared range, and which is characterized in that the lithium niobate single-crystal has a nearly stoichiometric composition.

DETAILED DESCRIPTION OF THE INVENTION

Figure 1:
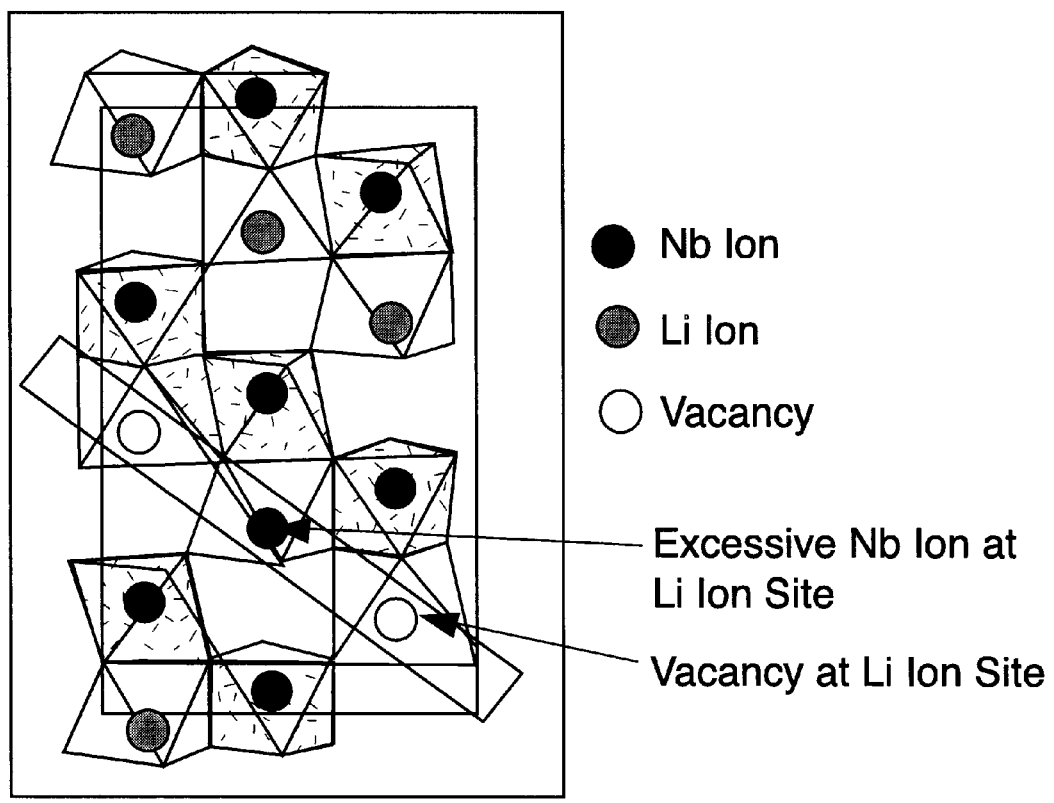
FIG. 1 is a graphical view showing a non-stoichiometric defect model of lithium niobate (LN) single-crystal.

Now, the invention is described in more detail with reference to the preferred embodiments thereof.

The lithium niobate single-crystal of the invention has a molar fraction of $Li_2O/(Nb_2O_5+Li_2O)$ of falling between 0.490 and 0.52, of which the chemical composition is nearer to its stoichiometric composition than that of ordinary lithium niobate single-crystal having a congruent composition with a molar fraction of $Li_2O/(Nb_2O_5+Li_2O)$ of 0.485. Accordingly, the crystal of the invention has a high degree of crystal perfectness while having a low defect density. In addition, it has good light transmission characteristics with little light scattering thereon, and the voltage necessary for its polarization inversion may be small or may be 10 kV/mm or lower. Therefore, accurate polarization inversion of the crystal within a minor range is possible. Accordingly, using the stoichiometric compositional, lithium niobate single-crystal of the invention, it is possible to provide a wavelength-conversion device capable of efficiently converting the wavelength of rays falling within a broad range of from visible rays to long-wave, near infrared rays.

To produce the lithium niobate single-crystal of the invention, for example, employable is an ordinary pulling method where crystal is pulled from a flux having a greatly Li-excessive composition (for example, having a molar fraction of $Li_2O/(Nb_2O_5+Li_2O)$ of from 0.56 to 0.60, preferably 0.58). However, for growing large lithium niobate single-crystal with more accurately controlling the non-stoichiometric defect density in the grown crystal and also the structure of the grown crystal, desired is a double-crucible method for single-crystal growing in which the raw material is continuously fed into the crucible.

Apart from the methods mentioned above, also employable herein are a pulling method where crystal is pulled from a flux having a stoichiometric composition or a congruent melt composition, to which is added an additive flux of $K_2O$ in an amount of not smaller than 5% by weight, and even a TSSG method.

The invention is further described hereinunder with reference to the following Examples, which, however, are not intended to restrict the scope of the invention.

EXAMPLE 1

Powdery materials of commercially-available, high-purity $Li_2CO_3$ and $Nb_2O_3$ were prepared. These were mixed in a ratio of $Li_2CO_3/Nb_2O_3$ falling between 0.56/0.44 and 0.60/0.40 to give Li-excessive mixtures, or in a ratio of $Li_2CO_3/Nb_2O_3=0.50/0.50$ to give a stoichiometric mixture. These mixtures were separately molded by isostatic rubber-press molding at a hydrostatic pressure of 1 ton/cm$^2$, and the resulting moldings were sintered in oxygen at about 1050° C. to obtain sintered rod for crystal pulling. On the other hand, the stoichiometric mixture having been prepared above was sintered in oxygen at about 1050° C. to prepare a sintered, stoichiometric mixture powder. Next, lithium niobate single-crystal having a nearly stoichiometric composition was grown according to a double-crucible method where the raw material was continuously fed into the crucible. Precisely, the seed crystal was put into a flux having an Li-excessive composition (for example, having a molar fraction of $Li_2O/(Nb_2O_5+Li_2O)$ of from 0.56 to 0.60 in the double-crucible, and pulled up at a pulling rate of 0.5 mm/hr and at a crystal revolution of 4 rpm to obtain lithium niobate single-crystal having a nearly stoichiometric composition of which the non-stoichiometric defect density was minimized.

In order to more accurately control the non-stoichiometric defect density in the grown crystal and also the structure of the grown crystal, the stoichiometric mixture having a molar fraction of $Li_2O/(Nb_2O_5+Li_2O)$ of 0.50 was automatically fed into the outer crucible, while being correspondent to the amount of the grown crystal. After having been thus grown for about 1.5 weeks, obtained were colorless, transparent lithium niobate single-crystal rods with no cracks, having a diameter of 40 mm and a length of 70 mm.

For their inside structure, the as-grown single-crystal rods were all in a single-domain condition, and did not require poling. The lithium niobate (LN) single-crystal samples obtained herein were subjected to chemical analysis for their composition, and their Curie point was measured. On the basis of the data obtained, the samples were evaluated. The composition of the crystal obtained varied, depending on the composition of the flux used. All the crystal samples obtained herein were found to have a nearly stoichiometric composition with a molar fraction of $Li_2O/(Nb_2O_5+Li_2O)$ of falling between 0.49 and 0.52. In addition, it was further found that the crystal samples obtained herein all had a minimized non-stoichiometric defect density, as compared with conventional LN single-crystal having a congruent melt composition, and that every crystal sample had extremely good compositional homogeneity.

Figure 2:
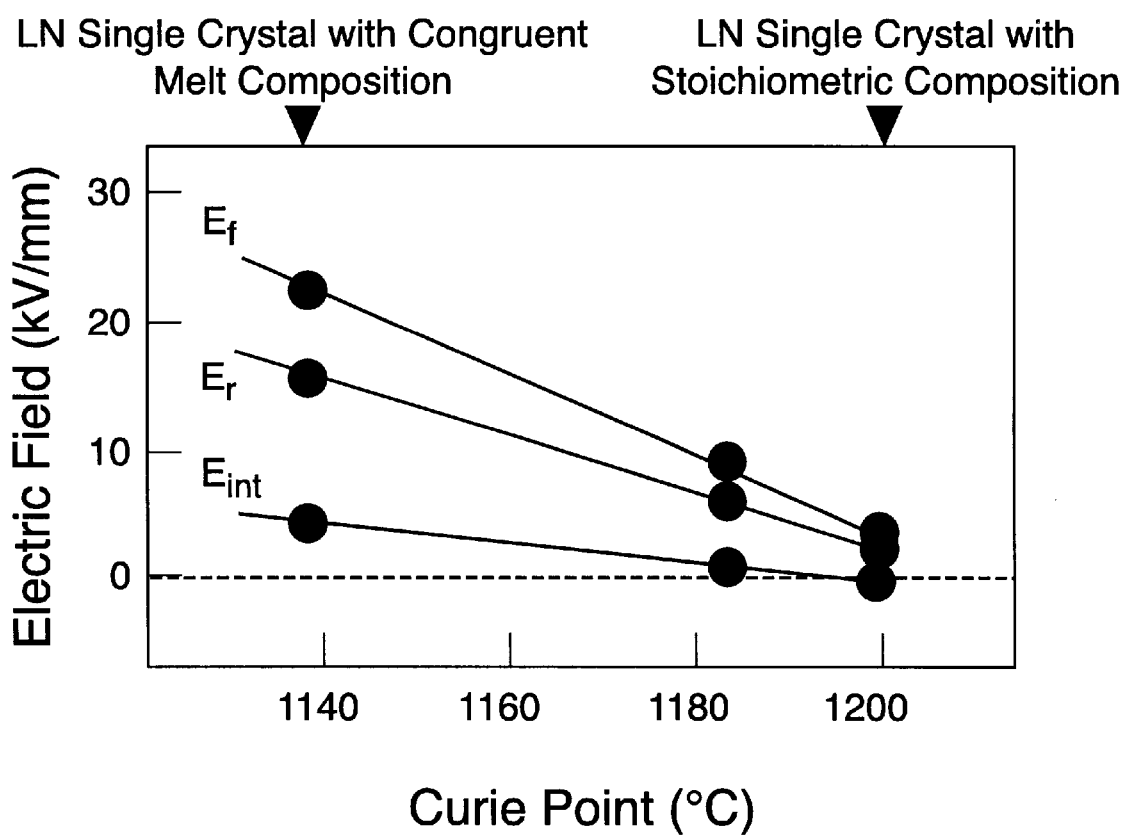
FIG. 2 is a graph comparatively showing the relationship between the Curie point and the ferroelectric characteristic of lithium niobate (LN) single-crystal having a congruent melt composition and that of LN single-crystal having a stoichiometric composition.
Figure 3:
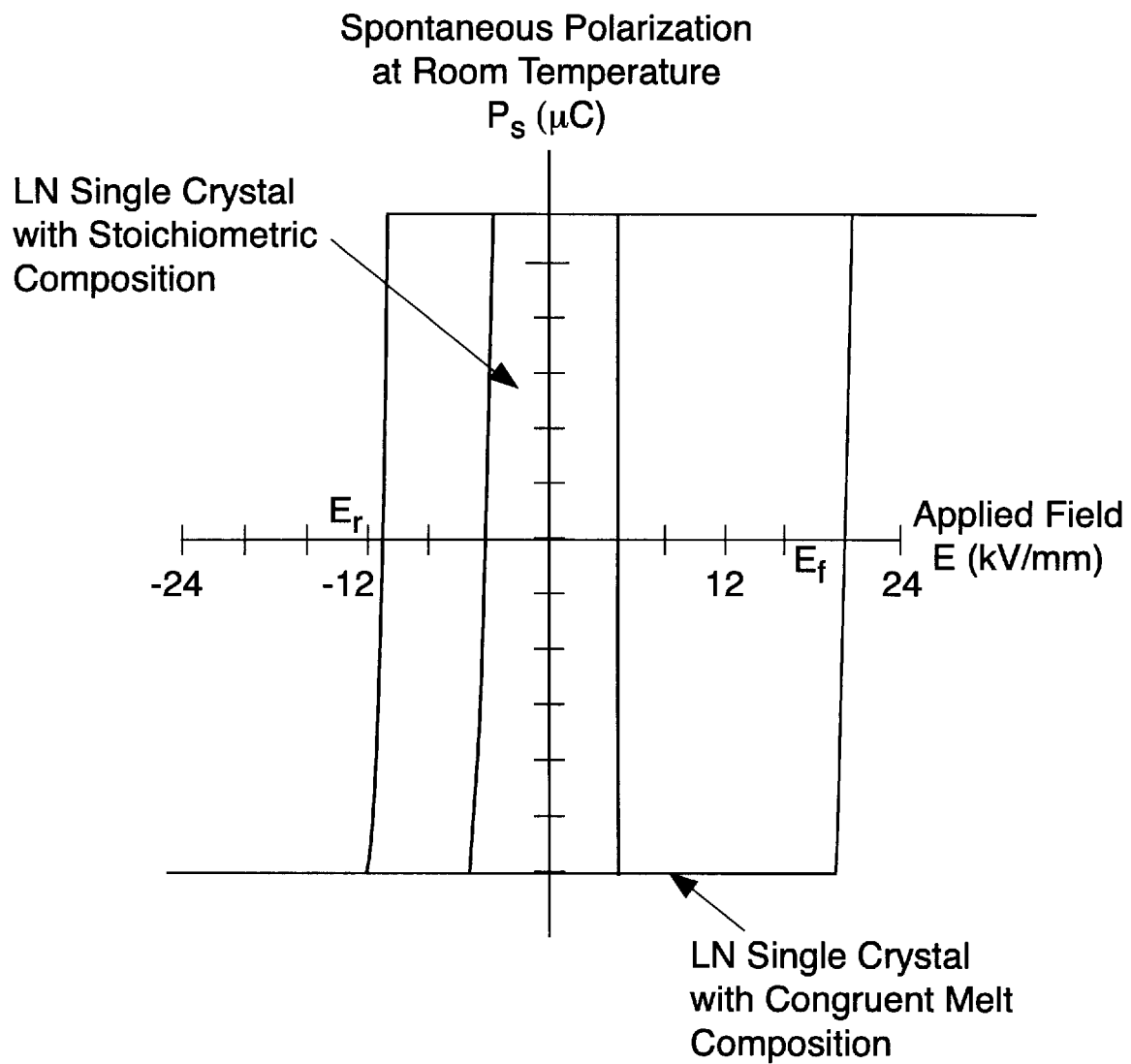
FIG. 3 is a graph showing the hysteresis characteristic of spontaneous polarization, relative to voltage applied, of lithium niobate (LN) single-crystal having a congruent melt composition and that of LN single-crystal having a stoichiometric composition.
Figure 4:
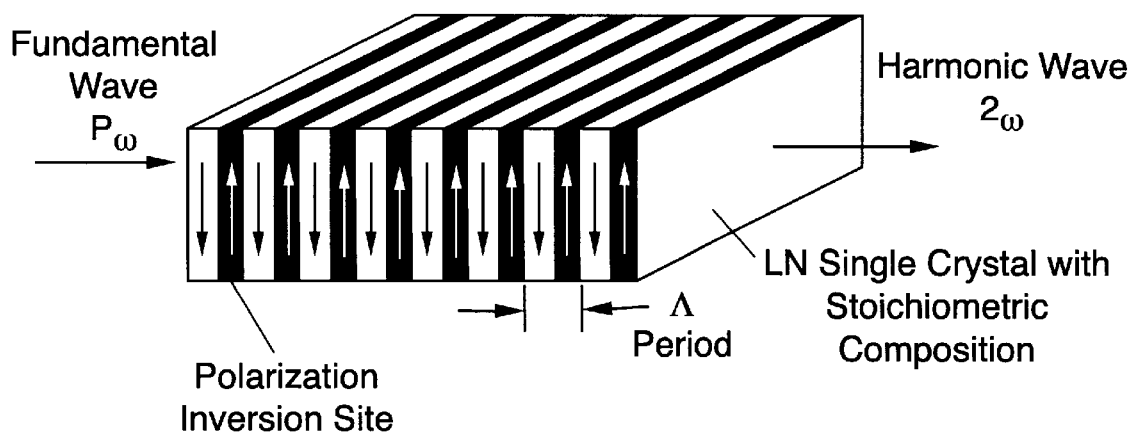
FIG. 4 is a graphical view showing a periodical polarization-inversion SHG photo-functional device having a substrate of lithium niobate (LN) single-crystal.

Next, each crystal sample was cut into test pieces having a size of 10 mm×10 mm and a thickness of 0.5 mm. An electrode was formed on the both Z-surfaces of each test piece, and a varying voltage was imparted to the test piece through the electrodes, whereupon the polarization-inversion voltage of the test piece was calculated from the change in the current having passed through the test piece. The data are shown in FIG. 2. As in FIG. 2, it is known that the polarization of the LN single-crystal samples of the present invention prepared herein was inverted at a voltage of about 3 or 4 kV/mm or so, while the voltage necessary for polarization inversion of the conventional LN single-crystal samples having a congruent melt composition was not lower than 20 kV/mm. The spontaneous polarization of the samples of the invention does not differ from that of the conventional samples. This means that the LN single-crystal of the invention is applicable to all uses to which the conventional LN single-crystal is applied. The hysteresis of the spontaneous polarization, relative to voltage applied, of LN single-crystal of the invention and that of the conventional LN single-crystal are shown in FIG. 3, from which it is known that the hysteresis of the LN single-crystal of the invention is more symmetrical than that of the conventional LN single-crystal. This means the excellent controllability of the LN single-crystal of the invention in the polarization inversion process of the crystal.

EXAMPLE 2

Herein produced were various photo-functional devices comprising a substrate of the lithium niobate (LN) single-crystal that had been prepared in Example 1. In those devices, the polarization inversion of the substrate was periodically varied. First produced were QPM-SHG devices capable of emitting blue light or green light from the fundamental wave of a near infrared ray having a wavelength of 840 nm or 1064 nm. Z-cut lithium niobate (LN) single-crystal substrates, of which the both surfaces had been polished, were prepared, each having a diameter of 2 inches and a thickness of from 0.5 to 2 mm. On their +Z surface, formed was a comb-like electrode pattern of an Al film having a thickness of 500 nm, according to lithography. In order to form a primary QPM structure for efficiently generating blue and green harmonics, the periodic pitch of the electrode pattern was 30 $\mu$m and 6.8 $\mu$m. Next, an insulating film having a thickness of 0.5 $\mu$m was over-coated on the thus-patterned, +Z surface, and heated at 350° C. for 8 hours for storage treatment.

Next, the substrate was sandwiched between electrodes via an aqueous electric solution of lithium chloride on its both Z surfaces, to which was applied a high-voltage pulse. The current passing through the lithium niobate (LN) crystal was monitored via a 1 k_-resistor. In the samples comprising the lithium niobate (LN) single-crystal of the invention, the domains in the crystal were inverted with a small voltage of about 3 kV/mm or so applied thereto, which is about 1/7 of the voltage to be applied to conventional LN devices for domain inversion. After the domain-inverted lattices were formed, the crystal was removed, and the side surface, Y-surface of the crystal was polished, and etched with a mixture of hydrofluoric acid and nitric acid. Then, the domain-inverted condition seen in the etched surface was checked. It was confirmed that the periodic domain to inversion width ratio and the domain profile were well regulated, by optimizing the pulse width and the current density of the voltage applied, to such that the periodic domain to polarization inversion width ratio could be an ideal ratio of 1/1 with accuracy throughout the entire region of the sample. The periodic domain inversion structure was accurately formed not only in the thin sample having a thickness of 0.5 mm but also in thick samples having a larger thickness, and it is believed that those samples are favorable for internal resonance-type wavelength conversion devices.

Next, wafers were cut out and their edges were polished. To these samples, applied were a semiconductor laser and an NdYAG laser. In this test, the samples having a length of 10 mm were found to have a power of SHG output at a conversion efficiency of about 50%. The SH light output power of the device samples produced herein did not lower with the lapse of time, being different from that of QPM-SHG devices comprising a conventional single-crystal substrate having a congruent melt composition.

It has heretofore been said that the decrease in the SH light output power of the conventional QPM-SHG devices is because of the optical damage done to the single-crystal material itself in the devices. Though not having been clarified as yet at present, the following three reasons could be taken into consideration for the stable output of the QPM-SHG devices comprising a substrate of the stoichiometric compositional lithium niobate single-crystal of the invention. The first reason is that the polarization inversion device of the invention has a small polarization inversion width of a few $\mu$m and that the polarization to inversion width ratio is a complete ratio of 1/1. Therefore, even though the device is optically damaged in some degree, the damaged area with anisotropy in the Z-axial direction in one domain could be offset by the others in the adjacent domains. The second reason is that, since the stoichiometric compositional LN single-crystal of the invention has a much lower non-stoichiometric defect density as compared with the conventional, congruent melt composition crystal, the photo-carrier in the former is influenced little by light scattering and has a large mobility, and therefore the photo-conductivity of the crystal of the invention is high. Like lithium niobate single-crystal containing MgO added thereto, it is believed that the crystal of the invention thus having a high photo-conductivity could cancel local photo-carriers that may cause optical damage, resulting in that little optical damage will be done to the crystal of the invention. The third reason is that, since the stoichiometric compositional crystal has a low non-stoichiometric defect density, it has few light-scattering factors and few macroscopic crystal defects such as striations, and therefore the light absorption by the crystal is very small. In particular, a thermal lens effect will cause optical damage to high-power SHG devices owing to the increase in the light absorption of fundamental waves and harmonic waves in those devices. However, it is believed that the stoichiometric LN single-crystal of the invention is free from those problems as its crystal perfectness is high and its light absorption is small.

The voltage application method has been described in detail herein as one example where the crystal polarization is inverted at a temperature not higher than the Curie point of the crystal, which, however, is not limitative. Apart from the disclosed method, the invention is applicable to any other methods of 1) internal Ti diffusion, 2) $SiO_2$-charged thermal treatment, 3) proton-exchanging thermal treatment or 4) electron beam-scanning irradiation. As the stoichiometric compositional LN single-crystal of the invention is well-regulated, perfect crystal, it is possible in those methods to realize an optical device comprising the crystal and having periodic polarization inversion lattices formed therein with accuracy.

In the example described in detail herein, produced were QPM-SHG devices capable of generating blue or green light from the near infrared fundamental wave having a wavelength of 840 nm or 1064 nm. However, in the invention, the fundamental waves are not limited to those two. The invention is applicable to any other waves falling within the range within which lithium niobate single-crystal is transparent and phase-matching of the crystal is possible. In addition, the photo-functional device comprising lithium niobate single-crystal of the invention, in which the polarization of the crystal is periodically inverted to thereby shorten or prolong the wavelength of a laser ray having a wavelength that falls within a range of from visible rays to near infrared rays and being incident on the device, is not limited to only second-harmonic generation (SHG) devices, but may be used in other various fields of remote sensing, gas detection, etc., for example, as photo-parametric resonance devices.

As has been described in detail herein above, the present invention provides lithium niobate single-crystal which requires a low voltage of not larger than 10 kV/mm for its polarization inversion and of which the polarization can be periodically inverted with accuracy even at such a low voltage, and provides a photo-functional device comprising the crystal. Thus, the invention is widely applicable to various optical techniques in various fields of optical information processing, optical working, photochemical reaction, optical instrumentation control and others where laser rays are used.

While the invention has been described in detail and with reference to specific embodiments thereof, it will be apparent to one skilled in the art that various changes and modifications can be made therein without departing from the spirit and scope thereof.

What is claimed is:

1. Lithium niobate single-crystal, which has a molar fraction of $Li_2O/(Nb_2O_5+Li_2O)$ of falling between 0.49 and 0.52 and requires a voltage of not larger than 10 kV/mm for its ferroelectric polarization inversion.

2. A photo-functional device comprising lithium niobate single-crystal, in which the polarization structure of the crystal is periodically inverted to thereby shorten or prolong the wavelength of the laser ray being incident on the device and falling within a visible to near infrared range, and which is characterized in that the lithium niobate single-crystal has a molar fraction of $Li_2O/(Nb_2O_5+Li_2O)$ of falling between 0.49 and 0.52.

3. The lithium niobate single crystal of claim 1 wherein the required voltage for ferroelectric polarization inversion is not larger than 5 kV/mm.

4. The device of claim 2 wherein the polarization structure of the crystal is periodically inverted by applying a voltage of not larger than 5 kV/mm.

5. The lithium niobate single crytal of claim 1 wherein the polarization inversion is throughout the bulk substrate.

6. The device of claim 2 wherein the periodic inversion is throughout the bulk substrate.

* * * * *